United States Patent [19]
Oshidari

[11] Patent Number: 6,155,953
[45] Date of Patent: Dec. 5, 2000

[54] TOROIDAL CONTINUOUSLY VARIABLE TRANSMISSION

[75] Inventor: Toshikazu Oshidari, Yokosuka, Japan

[73] Assignee: Nissan Motor Company, Ltd., Yokohama, Japan

[21] Appl. No.: 09/335,469

[22] Filed: Jun. 18, 1999

[30] Foreign Application Priority Data

Jun. 19, 1998 [JP] Japan .................................. 10-172432

[51] Int. Cl.$^7$ .............................. F16H 61/30; F16H 15/38
[52] U.S. Cl. ................................. 476/10; 476/42; 476/67
[58] Field of Search .................................. 476/10, 42, 46, 476/67

[56] References Cited

U.S. PATENT DOCUMENTS

| | | | |
|---|---|---|---|
| 5,136,891 | 8/1992 | Nakano | 476/10 |
| 5,423,727 | 6/1995 | Fellows | 476/46 |
| 6,030,309 | 2/2000 | Nakano | 476/10 |

FOREIGN PATENT DOCUMENTS

63-92859   6/1988   Japan .

*Primary Examiner*—Sherry Estremsky
*Attorney, Agent, or Firm*—Foley & Lardner

[57] ABSTRACT

The upper and lower ends of plural trunnions (46) of a toroidal continuously variable transmission are joined by links (50, 52). A trunnion shaft (70) is joined to the lower end of the trunnion (46). A boss (78A) of a piston (78) is attached to the outer circumference of the trunnion shaft (70), and tightened toward the trunnion (46) by a nut (82) which screws into the trunnion shaft (70). The upper end of the boss is formed as a plane surface, and a supporting surface (76E) of a supporting member (76) which supports this plane surface on the trunnion (46) is formed as a spherical surface. When the spherical surface and plane surface under a relative displacement, a bending load which acts on the trunnion (46) is prevented from acting on the piston (78), and wear of the piston (78) is suppressed.

6 Claims, 6 Drawing Sheets

TOROIDAL CONTINUOUSLY VARIABLE TRANSMISSION

FIELD OF THE INVENTION

This invention relates to the construction of a toroidal continuously variable transmission for a vehicle.

BACKGROUND OF THE INVENTION

Jikkai Sho 63-92859 published by the Japanese Patent Office in 1988 discloses a toroidal continuously variable transmission for a vehicle.

In this transmission, a speed ratio is varied according to a variation of a gyration angle of plural power rollers gripped between an input disc and output disc. The gyration angle of each power roller changes according to the displacement of a trunnion supporting each power roller. The trunnion displaces along a trunnion axis forming a right angle with the rotation axis of the input disc and output disc. Due to this movement, the input and output discs cause the trunnion a rotational displacement within predetermined limits centered on the trunnion axis, thereby varying the gyration angle of the power roller.

The axial displacement of the trunnion is achieved by applying a hydraulic pressure to a fixed piston via a shaft.

The displacement of the trunnion in the axial direction and its rotational displacement are fed back to a speed ratio control valve which controls the aforesaid hydraulic pressure by a precess cam attached to the end of the shaft. In this way, the oil pressure is controlled so that the continuously variable transmission reaches a desired speed ratio.

SUMMARY OF THE INVENTION

However, the power rollers gripped between the input disc and output disc are always subject to a force tending to push them out in a radial direction based on the gripping force. This pushing force acts on the trunnion shafts in an orthogonal direction to the trunnion axes. As the upper ends and lower ends of the trunnions are respectively supported by a link, this external force brings a bending load to bear on the trunnions.

As this bending load functions as a force which inclines a piston joined to the trunnion shaft, it causes a large frictional force to act on the sliding surface formed between the walls of the oil chamber housing the piston and the piston, and is a factor responsible for piston wear.

In a vehicle provided with an antilock brake, the speed ratio may not be set to maximum, i.e., not varied to the lowest side, when the vehicle is stopped. This is to prevent the antilock function from declining by maximizing the speed ratio when the vehicle is sharply braked.

In such a case, when the vehicle is restarted, the speed ratio must be varied from the speed ratio when the vehicle has stopped to the maximum speed ratio, and the trunnion is displaced along the trunnion axis via the piston.

Due to this displacement, the input disk and output disk exert a rotational force on the trunnions around the trunnion axes via the power rollers, but as this rotational force is applied sharply, slack may appear in nuts which fix the pistons on the trunnion shafts.

It is therefore an object of this invention to ensure that the bending load acting on the trunnion does not increase the frictional force between the piston and the wall surface of the oil chamber.

It is a further object of this invention to prevent slack in a nut which fixes the piston to the trunnion shaft.

In order to achieve the above objects, this invention provides a toroidal continuously variable transmission, comprising an input disc and output disc disposed relative to each other so as to form a toroidal groove, plural power rollers gripped in the groove, trunnions supporting the power rollers, each of the trunnions having an upper end and a lower end, a link connecting the upper ends of the trunnions, a link connecting the lower ends of the trunnions, a trunnion shaft joined to the lower end of each of the trunnions, the trunnion shaft having an outer circumference, a piston comprising a boss, the boss engaging with the outer circumference of the trunnion shaft and having a contact surface, a supporting member gripped between the trunnion and the boss, the supporting member having a contact surface which comes in contact with the contact surface of the boss, and a nut which screws into the trunnion shaft so as to press the boss against the supporting member, wherein one of the two contact surfaces is formed to a plane surface and the other of the surfaces is formed to a spherical surface.

The details as well as other features and advantages of this invention are set forth in the remainder of the specification and are shown in the accompanying drawings.

DESCRIPTION OF THE PREFERRED EMBODIMENTS

Figure 1:
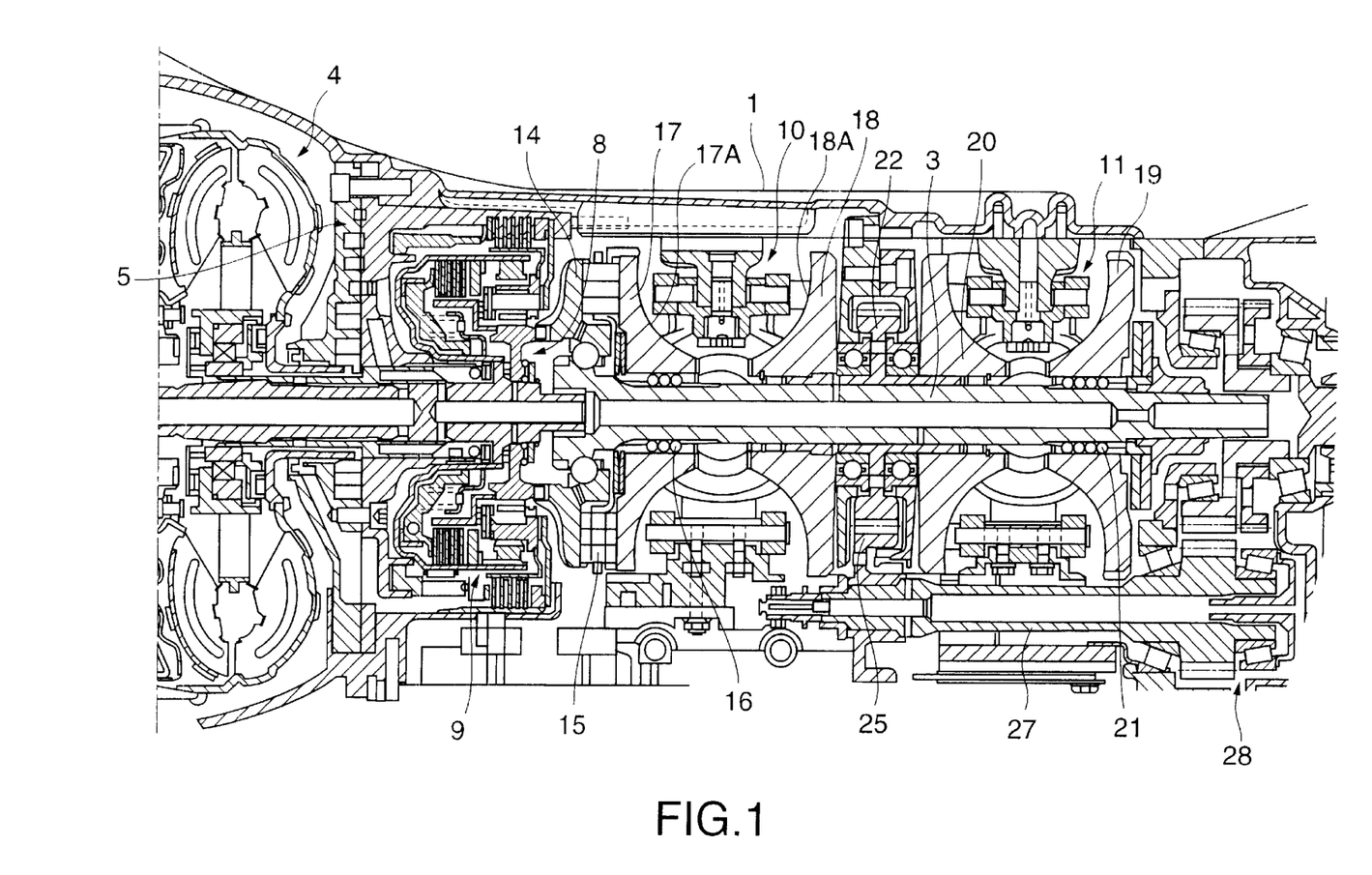
FIG. 1 is a longitudinal-sectional view of a toroidal continuously variable transmission according to this invention.

Referring to FIG. 1 of the drawings, a toroidal continuously variable transmission is provided with first and second toroidal units 10, 11 arranged in series in a transmission case.

The rotation of an engine is transmitted to a cam flange 14 via a torque converter 4, oil pump 5, and forward/reverse change-over mechanism 9.

The rotation of the cam flange 14 is transmitted to an input disc 17 of the first toroidal unit 10 via cam rollers 15.

The input disc 17 is joined to the input disc 19 of the second toroidal unit 11 via a rotation shaft 3. These input discs 17, 19 are respectively connected to the rotation shaft 3 via ball splines 16, 21, and are permitted to perform a displacement in an axial direction along the rotation shaft 3 while their rotation relative to the rotation shaft 3 is locked.

The cam rollers 15 give a thrust load according to the rotational movement of the cam flange 14 with respect to the input discs 17, 19, and push the input discs 17, 19 toward the output discs 18, 20 which respectively face the input discs 17, 19. The output discs 18, 20 are free to rotate on the outer circumference of the rotation shaft 3.

Figure 2:
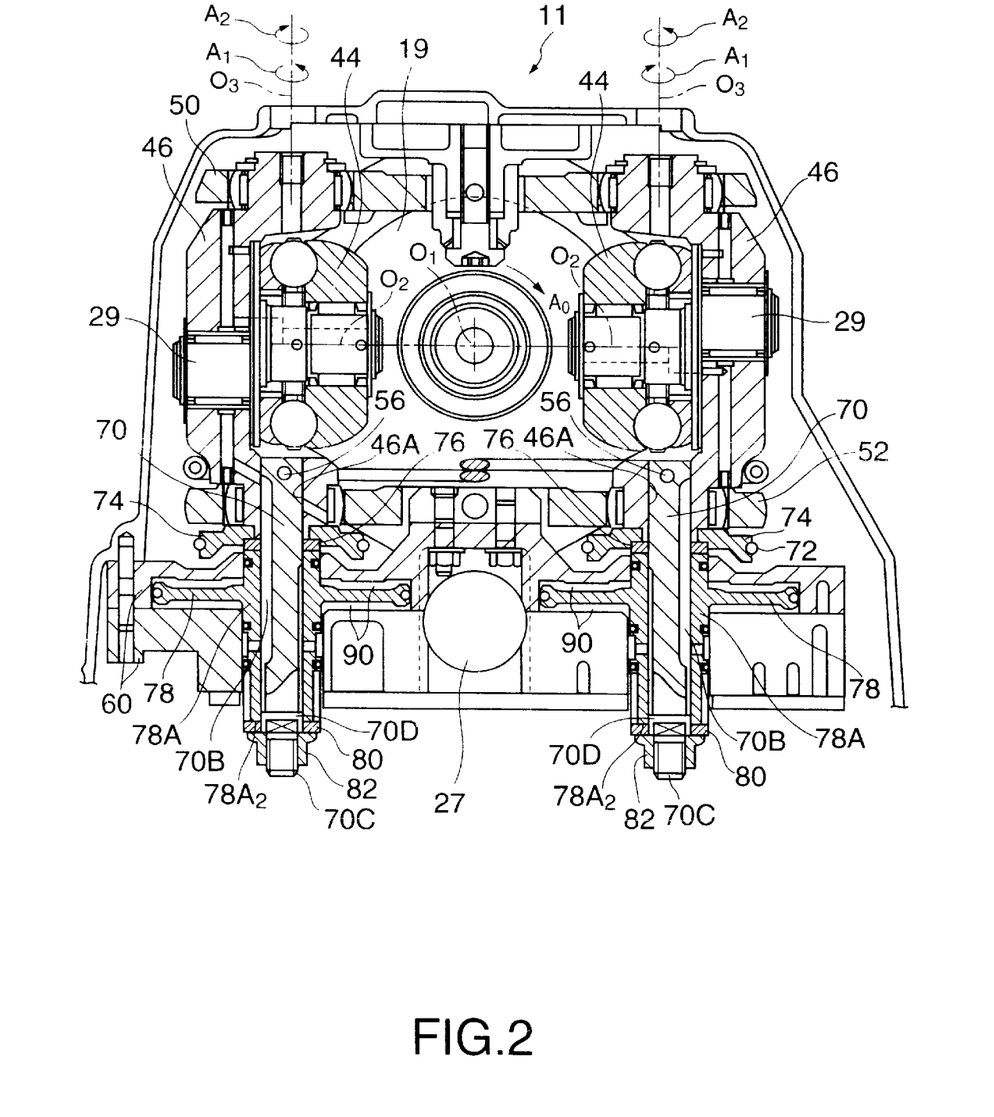
FIG. 2 is a cross-sectional view of a toroidal continuously variable transmission.

The input disc 17 and output disc 18 which form the first toroidal unit 10 have toroidal wall surfaces 17A, 18A facing each other, and a pair of power rollers 44 is gripped by the wall surfaces 17A, 18A due to the aforementioned thrust load, as shown in FIG. 2. Identical power rollers are gripped between the input disc 19 and output disc 20 of the second toroidal unit 11. The rotation of the input discs 17, 19 is transmitted to the output discs 18, 20 via these power rollers 44. The rotation of the output discs 18, 20 is transmitted to an output shaft, not shown, via an output gear 22, gear 25, countershaft 27 and gear 28.

The contact points of the input disc 17 (19) and output disc 18 (20) with the power rollers 44 vary according to the gyration angle of the power rollers 44 around the shaft 03 of FIG. 2, and the ratio of rotation speeds of the input disc 17 (19) and output dics 18 (20) is determined according to the distances from the contact points of the input and output discs 17, 18(19, 20) with the power rollers 44 to a rotation axis $O_1$ of the rotation shaft 3. This rotation speed ratio of the input and output discs 17, 18(19, 20) is the speed ratio of the transmission.

Next, the detailed construction of the parts of the toroidal units will be described referring to FIG. 2. Hereafter, the description will refer to the second toroidal unit 11, but it will be understood that the construction of the first toroidal unit 10 is identical to that of the second toroidal unit 11 unless otherwise specified.

Each toroidal unit comprises a pair of trunnions 46 to support the power rollers 44. The power rollers 44 are supported via a crank-shaped eccentric shaft 29 on each trunnion 46. The eccentric shaft 29 comprises a base end supported free to rotate on the trunnion 46 and a tip bent in a crank shape. The power rollers 44 are supported free to rotate around the rotation axis $O_2$ due to this tip. Further, the power rollers 44 are permitted to pivot around the base end within predetermined limits.

The upper part of each trunnion 46 is connected by an upper link 50 via a spherical joint. The lower part of each trunnion 46 is connected by a lower link 52 via a spherical joint. In the lower part of the trunnion 46, a shaft hole 46A is formed, and a trunnlon shaft 70 is joined to the trunnion 46 by a pin 56 inserted into in this shaft hole 46A from underneath.

Figure 3:
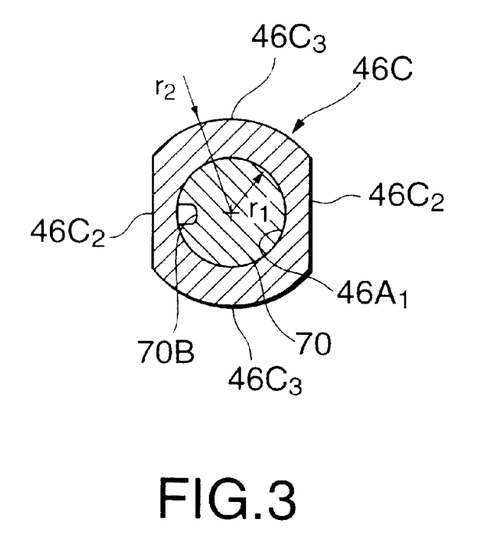
FIG. 3 is a cross-sectional view of a lower part of a trunnion according to this invention.

The trunnion shaft 70 is a columnar piece of radius $r_1$ as shown in FIG. 3. An oil groove 70B for lubricating oil is formed in an axial direction on the outer circumference of the trunnion shaft 70.

A pulley 74 is fixed to the outer circumference of the lower part of the trunnion 46. The rotational displacements of each trunnion of the two toroidal units 10, 11 are synchronized by looping a wire around this pulley 74 and the pulley of the corresponding first toroidal unit 10.

Also, the rotational displacements of two trunnions in the same unit are synchronized in the reverse direction by another wire.

For the purpose of fixing the pulley 74, a narrow diameter part 46C having two perpendicular plane surfaces $46C_2$ and curved surfaces $46C_3$ is formed in the lower part of the trunnion 46, as shown in FIG. 3. The diameter $r_2$ of the curved surface $46C_3$ is set larger than the diameter $r_1$ of the trunnion shaft 70.

Figure 4:
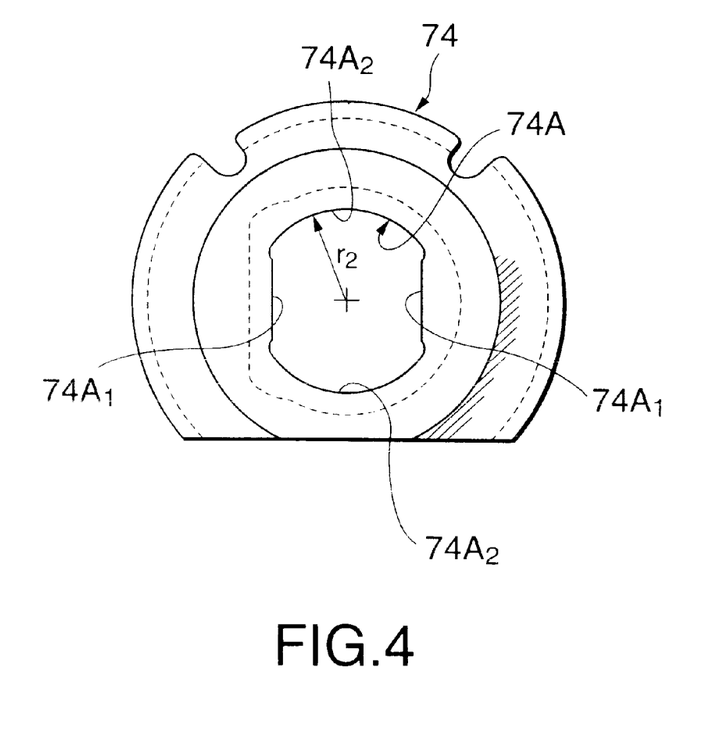
FIG. 4 is a plan view of a pulley according to this invention viewed from above.
Figure 7:
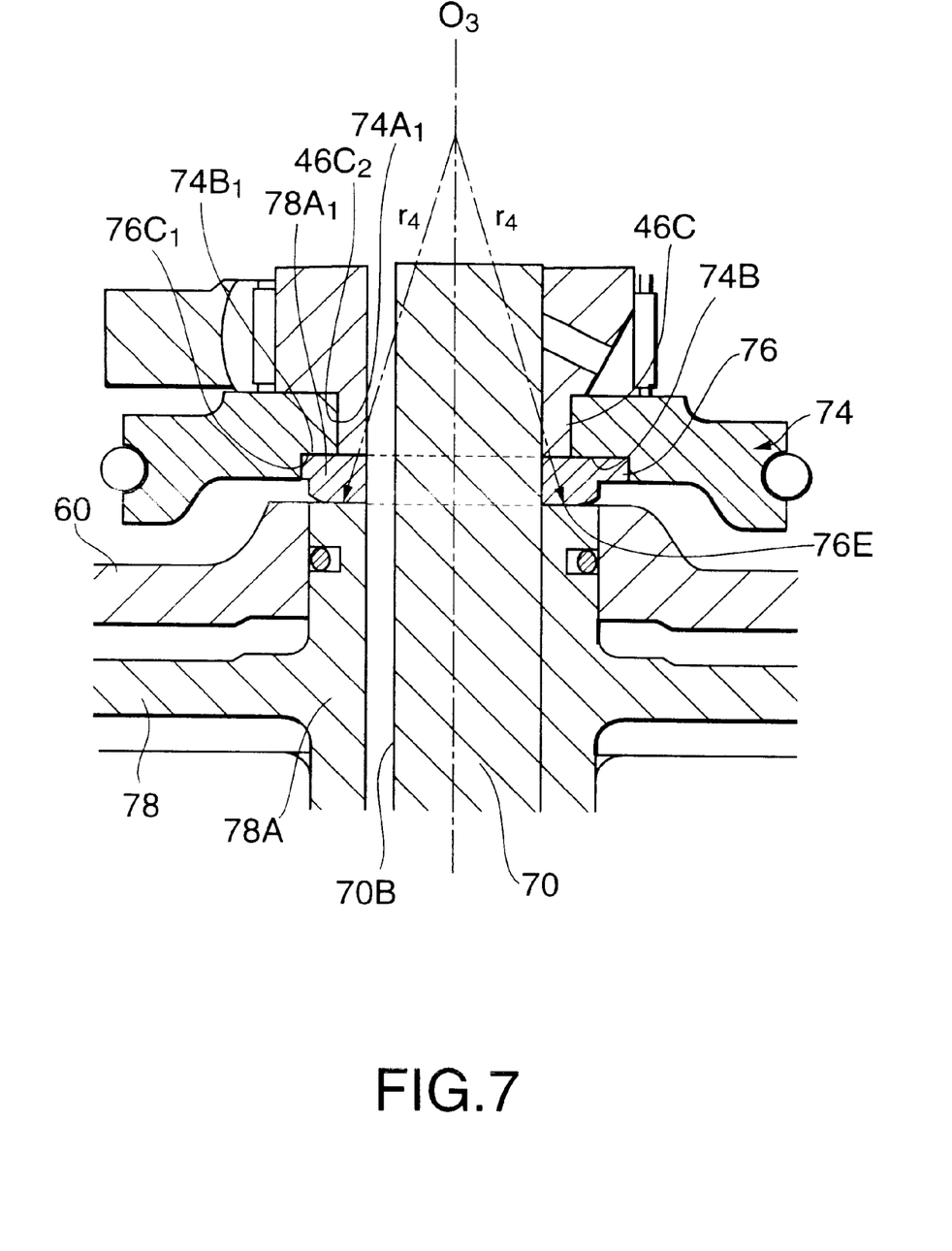
FIG. 7 is a longitudinal-sectional view of a piston boss and stop washer according to this Invention.

The pulley 74 has a fitting hole 74A in its center formed by two perpendicular planes $74A_1$ and curved surfaces $74A_2$ being the same shape as the outer circumference of the narrow diameter part 46C, as shown in FIG. 4. The pulley 74 engages with the outer circumference of the narrow diameter part 46C in contact with the plane surface $46C_2$ and the plane surface $74A_1$, as shown in FIG. 7.

Figure 5:
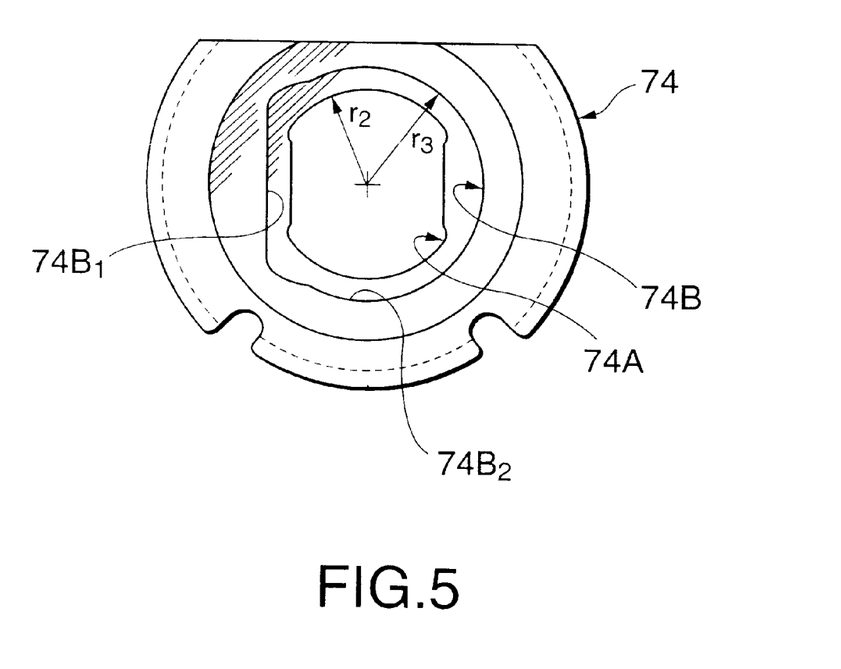
FIG. 5 is a plan view of the pulley viewed from below.

A recess 74B is formed in the lower face of the pulley 74 from a plane surface $74B_1$ and a curved surface $74B_2$ of diameter $r_3$, as shown in FIG. 5.

Figure 6:
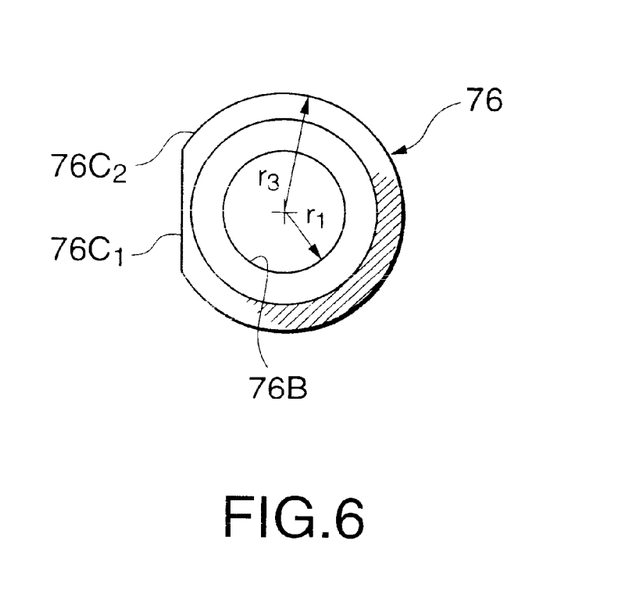
FIG. 6 is a plan view of a stop washer according to this invention.

A ring-shaped stop washer 76 of a similar shape to the recess 74B is embedded in this notch 74B, as shown in FIG. 6. The stop washer 76 comprises a plane surface $76C_1$ joined to the plane surface $74B_1$ and a curved surface $76C_2$ joined to the plane surface $74B_2$ on its outer circumference. It also comprises an inner circumferential part 76B of radius $r_1$ which engages with the trunnion shaft 70.

A cylindrical boss 78A of the piston 78 is fitted on the outer circumference of the trunnion shaft 70 extending downwards from the stop washer 76. An upper end face $78A_1$ of the boss 78A is formed as a flat surface perpendicular to the axis $O_3$ of the trunnion shaft 70, as shown in FIG. 7. A lower end face $78A_2$ of the boss 78A is formed as a similar plane surface, as shown in FIG. 2.

Figure 8:
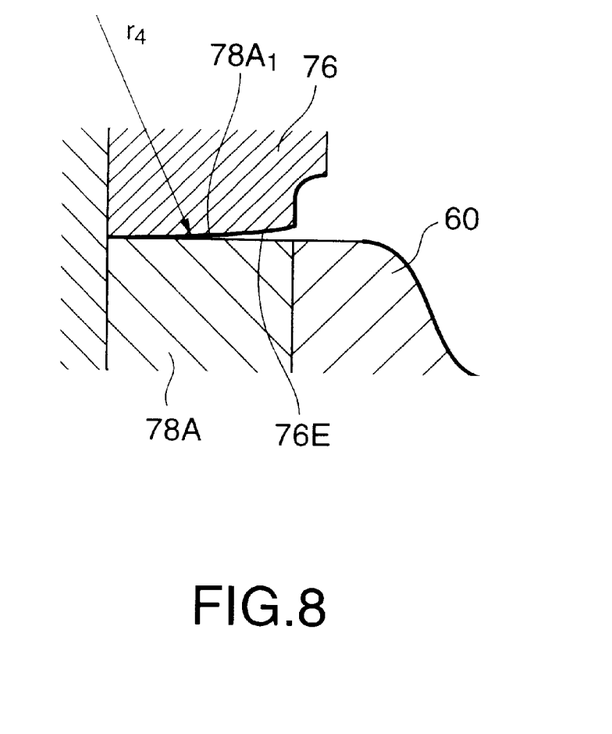
FIG. 8 is an enlarged view of essential parts of FIG. 7.

On the other hand, a lower surface 76E of the stop washer 76 which comes in contact with the upper end face $78A_1$ of the boss 78A is formed as a curved surface of radius $r_4$, as shown in FIG. 8.

Upper and lower oil chambers 90 are formed by a piston housing 60 above and below the piston 78 so as to exert an oil pressure on the piston 78. For this purpose, the piston housing 60 contacts with the outer circumference of the piston 78 and the outer circumference of the boss 78A above and below the piston 78 via seal members.

A screw 70C for tightening the nut 82 is formed at the lower end of the trunnion shaft 70 extending downwards through the boss 78A. Also, the trunnion shaft 70 comprises a large diameter part 70D having the shape shown in FIG. 9 above the screw 70C. The large diameter part 70D comprises two vertical surfaces $70D_1$ and curved surfaces $70D_2$ as shown in the figure. The nut 82 is tightened on this large diameter part 70D on the screw 70C.

Figure 9:
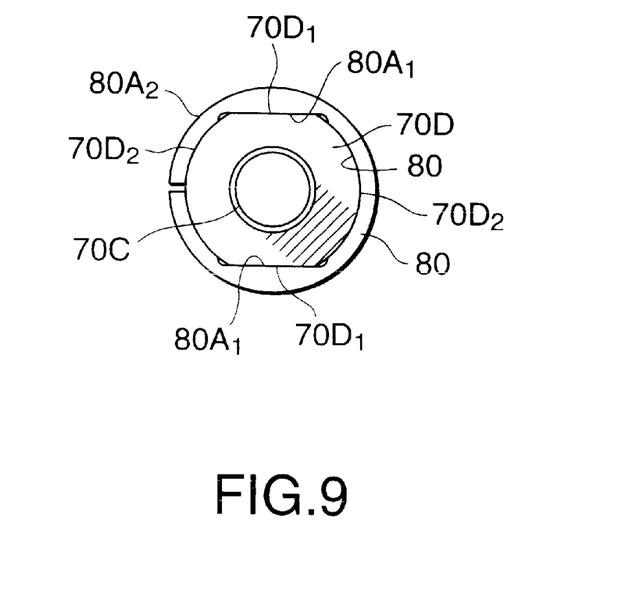
FIG. 9 is a cross-sectional view of a trunnion shaft with a nut rotation stop washer according to this invention.

A nut rotation stop washer 80 is interposed between the boss 78A and nut 82. The nut rotation stop washer 80 has two plane surfaces $80A_1$ and curved surfaces $80A_2$ as shown in FIG. 9, and engages with the outer circumference of the large diameter part 70D so that the plane surface 80A meets the plane surface $70D_1$ of the large diameter part 70D, and the curved surface $80A_2$ meets the curved surface $70D_2$ of the large diameter part 70D.

In this way, the boss 78A of the piston 78 is fixed to the trunnion 46 gripped between the stop washer 76 and nut rotation stop washer 80 by tightening the nut 82 on the trunnion shaft 70.

Also, the pulley 74 is fixed to the trunnion 46 gripped between the trunnion 46 and stop washer 76.

When a rotational torque is transmitted between the input disc 17 and output disc 19, a pressing force in a direction away from the rotation axis $O_1$ always acts on the power roller 44. However, as the upper end and lower end of the trunnion 46 are restricted by the upper link 50 and lower link 52, this force acts as a bending load on the trunnion 46.

Due to this bending load the spherical lower surface 76E of the stop washer 76 and the boss 78A of the piston 78 undergo a relative displacement in a joint-like manner. This relative displacement absorbs the bending load, and prevents the piston 78 from inclining. Therefore, an excessive frictional force does not act on the sliding parts of the piston 78 and boss 78A with respect to the piston housing 60, eccentric wear of these members can be prevented, and speed ratio control improves. This joint structure is realized only by spherical surface machining of the lower surface 76E of the stop washer 76, hence the cost of machining is very much suppressed.

As an upper surface 76D of the stop washer 76 comes in contact with the recess 74B and the narrow diameter part 46C of the pulley 74 over a large area, as shown in FIG. 7, leak of lubricating oil from the oil groove 70B to the outside of the trunnion 46 can definitively be prevented. The piston 78 displaces in the up/down direction due to the oil pressure supplied to one of the oil chambers 90. As a result, the contact point of the input disc 17 and output disc 19 with the over roller 44 shifts, and as a result, a rotation force acts on the power roller 44 around the rotation axis $O_3$. At that time, the left and right trunnions 46 undergo the following relative displacement with respect to the shaft $O_3$.

First, when the piston 78 on the right side in FIG. 2 is driven upwards, the piston 78 on the left side is driven downwards. Oil pressure control is therefore performed so that, of the oil chambers 90, the pressures of the upper oil chamber of the piston 78 on the right side and the lower oil chamber of the piston 78 on the left side are equal, and the pressures of the lower oil chamber of the piston 78 on the right side and the upper oil chamber of the piston on the left side are equal. When the trunnion 46 displaces along the shaft $O_3$ due to being driven by the piston 78, the trunnion 46 rotates together with power roller 44 around the axis $O_3$.

For example, providing that the input disc 17 is rotating in the direction of an arrow $A_0$ shown in FIG. 2, the speed ratio increases, i.e.,the output shaft rotation speed varies in a decreasing direction relative to the input shaft rotation speed, when the piston 78 on the right side of FIG. 2 is driven downwards, the trunnion 46 on the right side of FIG. 2 rotates in the direction of an arrow $A_2$, and the trunnion 46 on the left side of FIG. 2 rotates in the direction of an arrow $A_1$. The speed ratio decreases, i.e., the output rotation speed increases relative to the input rotation speed, when the piston 78 on the right side of FIG. 2 is driven upwards, the trunnion 46 on the right side of the figure rotates in the direction of the arrow $A_1$, and the trunnion 46 on the left side rotates in the direction of the arrow $A_2$.

Corresponding to these rotation directions, in the trunnion 46 on the fight side of the figure, the screw 70C is formed so that the nut 82 screws deeper on the trunnion shaft 70 by turning the trunnion shaft 70 in the direction $A_2$ relative to the nut 82, and in the trunnion on the left side of the figure, the screw 70C is formed so that the nut 82 screws deeper on the trunnion shaft 70 by turning the trunnion shaft 70 in the direction $A_1$ relative to the nut 82. Also, the nuts 82 have reversed thread directions in the left and right trunnions 46.

For example, if the vehicle stops under a small speed ratio, and is then restarted, the maximum speed ratio is achieved by increasing oil pressure in the lower oil chamber of the piston 78 on the right side and the upper oil chamber of the piston 78 on the left side so as to move the trunnion 46 on the right side upward and the trunnion 46 on the left side downward. When this operation takes place, the power roller 44 exerts a large rotational torque on the trunnion 46. This torque causes the trunnion 46 on the right side of FIG. 2 to displace in the direction of the arrow $A_2$, and it rotates the trunnion shaft 70 and piston 78 in the same direction. At that time, frictional resistance occurs between the piston 78 and piston housing 60. If the nut 82 touched the boss 78A, this frictional resistance would act as a force preventing rotation of the nut 82, but in this transmission, the transmission of this force is prevented by interposing a rotation stop washer 80 between the boss 78A and nut 82.

When the engagement of the rotation stop washer 80 and large diameter part 70D is slack, relative rotation occurs between the rotation stop washer 80 and large diameter part 70D within the limits of this slackness, and a rotation limiting force due to the aforesaid frictional resistance also acts on the nut 82. However, Due to this rotation limiting force, the nut 82 engages with the rotating trunnion shaft 70 more deeply, so this rotation limiting force does not lessen the tightening of the nut 82.

At that time also, the trunnion 46 on the left side of FIG. 2 rotates in the direction $A_1$. Regarding this rotation, looseness of the nut 82 is prevented as in the case of the trunnion 46 on the right side due to the presence of the rotation stop washer 80 and the setting of the screw direction of the nut 82 and screw 70C, which is opposite to the screw direction of those on the right side.

The behavior of the first toroidal unit 10 is identical to that of the second toroidal unit 11.

The contents of Tokugan Hei 10-172432, with a filing date of Jun. 19, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiment, the lower surface 76E of the stop washer 76 is machined into a spherical surface and the upper end surface $78A_1$ of the boss 78A is machined into a plane surface, but the former may be machined into a plane surface and the latter machined into a spherical surface.

The embodiments of this invention in which an exclusive property or privilege is claimed are defined as follows:

What is claimed is:

1. A toroidal continuously variable transmission, comprising:

an input disc and output disc disposed relative to each other so as to form a toroidal groove, plural power rollers gripped in said groove, trunnions supporting said power rollers, each of said trunnions having an upper end and a lower end, a link connecting the upper ends of said trunnions, a link connecting the lower ends of said trunnions, a trunnion shaft joined to the lower end of each of said trunnions, said trunnion shaft having an outer circumference, a piston comprising a boss, said boss engaging with the outer circumference of the trunnion shaft and having a contact surface, a supporting member gripped between said trunnion and said boss, said supporting member having a contact surface which comes in contact with said contact surface of said boss, and a nut which screws into said trunnion shaft so as to press said boss against said supporting member, wherein one of said two contact surfaces is formed to a plane surface and the other of said surfaces is formed to a spherical surface.

2. A continuously variable transmission as defined in claim 1, wherein said contact surface of said supporting member is formed to a spherical surface, and said contact surface of said boss is formed to a plane surface.

3. A continuously variable transmission as defined in claim 1, wherein said supporting member is a ring-shaped member which said trunnion shaft passes through.

4. A continuously variable transmission as defined in claim 1, wherein said transmission further comprises a pulley which engages with an outer circumference of the lower end of said trunnion, and a contact part between the lower end and said pulley having a non-circular cross-section, and said supporting member is gripped between said pulley and said boss.

5. A continuously variable transmission as defined in claim 1, wherein said transmission further comprises a washer which engages with said trunnion shaft via a contact part of non-circular cross-section, and is gripped between said nut and said boss.

6. A continuously variable transmission as defined in claim 1, wherein a screw forming direction of said nut and said trunnion shaft is set so that said nut screws deeper into said trunnion shaft due to a rotational resistance exerted by said boss on said nut relative to a rotational displacement of said trunnion accompanying an increase of a speed ratio of said transmission.

* * * * *